United States Patent
Kim (10) Patent No.: US 8,542,995 B2
(45) Date of Patent: Sep. 24, 2013

(54) OPTICAL NETWORK TERMINAL, METHOD FOR TIME SYNCRONIZATION THEREOF, OPTICAL LINE TERMINAL, AND METHOD FOR MANAGING NETWORK THEREOF

(75) Inventor: Sung Chang Kim, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 415 days.

(21) Appl. No.: 12/902,273

(22) Filed: Oct. 12, 2010

(65) Prior Publication Data

US 2011/0129218 A1    Jun. 2, 2011

(30) Foreign Application Priority Data

Nov. 27, 2009 (KR) .................. 10-2009-0116146

(51) Int. Cl.
*H04J 14/00* (2006.01)
*H04B 10/12* (2011.01)

(52) U.S. Cl.
USPC ............. 398/45; 398/154; 398/156; 398/168

(58) Field of Classification Search
USPC ............................ 398/45, 154, 151, 156, 168
See application file for complete search history.

(56) References Cited

U.S. PATENT DOCUMENTS

| | | | |
|---|---|---|---|
| 6,792,101 B2 | 9/2004 | Peeters et al. | |
| 2007/0025481 A1 | 2/2007 | Ryu et al. | |
| 2008/0089685 A1* | 4/2008 | Kazawa et al. | 398/66 |
| 2008/0089686 A1* | 4/2008 | Kazawa et al. | 398/71 |
| 2009/0010642 A1* | 1/2009 | Sui et al. | 398/9 |
| 2009/0067850 A1* | 3/2009 | Mizutani et al. | 398/154 |
| 2009/0162063 A1* | 6/2009 | Mizutani et al. | 398/58 |
| 2010/0272259 A1* | 10/2010 | Kim et al. | 380/256 |

FOREIGN PATENT DOCUMENTS

| | | | |
|---|---|---|---|
| KR | 10-2001-0113509 A | 12/2001 | |
| KR | 10-2007-0009390 A | 1/2007 | |

* cited by examiner

*Primary Examiner* — Ken N Vanderpuye
*Assistant Examiner* — Abbas H Alagheband
(74) *Attorney, Agent, or Firm* — Kile Park Reed & Houtteman PLLC (57) ABSTRACT

A method for synchronizing time by an optical network terminal (ONT) in a passive optical network system is provided. The method includes: receiving a ranging request message including a first current time of an optical line terminal (OLT); calculating a first compensation time when a transmission delay is compensated at a time that the ranging request message is received; transmitting a serial number response message to the OLT; calculating a second compensation time when the transmission delay is compensated at a time when the serial number response message is transmitted; receiving a ranging time message including a second current time when the serial number response message from the OLT is received; calculating an offset time from the first current time, the second current time, the first compensation time, and the second compensation time; and synchronizing a clock of the ONT and a clock of the OLT based on the offset time.

14 Claims, 5 Drawing Sheets

OPTICAL NETWORK TERMINAL, METHOD FOR TIME SYNCRONIZATION THEREOF, OPTICAL LINE TERMINAL, AND METHOD FOR MANAGING NETWORK THEREOF

CROSS-REFERENCE TO RELATED APPLICATION

This application claims priority to and the benefit of Korean Patent Application No. 10-2009-0116146 filed in the Korean Intellectual Property Office on Nov. 27, 2009, the entire contents of which are incorporated herein by reference.

BACKGROUND OF THE INVENTION (a) Field of the Invention

The present invention relates to an optical network terminal, a method for time synchronization thereof, an optical line terminal, and a method for managing a network thereof.

(b) Description of the Related Art

A gigabit capable passive optical network (GPON) is a system that includes multiplexed voices, data, or video signals in an optical signal, transmits them to a passive element through an optical fiber and an optical splitter that is shared by subscribers, and implements a gigabit transmission speed. The gigabit capable passive optical network provides an optical network terminal management control interface (OMCI) that has a rapid downstream transmission speed and an efficient management function, thereby making it possible to increase inter-operability and simply manage operation.

The gigabit capable passive optical network requires time synchronization between a controller and a base station in order to support a seamless handover between the user terminal and the base station, and performs the time synchronization in order to minimize the interface between the system frequencies to be used for a system using time division duplexing (TDD).

Meanwhile, the gigabit capable passive optical network has an asymmetrical form having different downlink and uplink speeds, and the method for time synchronization in the related art is implemented to meet the network a symmetrical shape having the same downlink and uplink speeds. Therefore, a method for time synchronization meeting the gigabit capable passive optical network is needed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to accurately and easily perform time synchronization between an optical line terminal and an optical network terminal in a gigabit capable passive optical network having an asymmetrical transmission speed.

A method for time synchronization according to an exemplary embodiment of the present invention provides a method for synchronizing time by an optical network terminal (ONT) that is a connection apparatus of a subscriber of a passive optical network system, the method for time synchronization including: shifting to a ranging state; receiving a ranging request message that includes a first current time of the optical line terminal from the optical line terminal (OLT) that is a transmitting/receiving apparatus of a service provider of the passive optical network system; calculating a first compensation time when a transmission delay is compensated at a time that the ranging request message is received; transmitting a serial number response message to the optical line terminal; calculating a second compensation time when the transmission delay is compensated at a time that the serial number response message is transmitted; receiving a ranging time message that includes a second current time when the serial number response message from the optical line terminal is received; calculating an offset time from the first current time, the second current time, the first compensation time, and the second compensation time; and synchronizing a clock of the optical network terminal and a clock of the optical line terminal based on the offset time.

The calculating the offset time may include: calculating a unidirectional delay delta value based on the first current time, the second current time, the first compensation time, the second compensation time, a refractive index of an upstream wavelength, and a refractive index of a downstream wavelength; and calculating the offset time based on the unidirectional delay delta value, a length of a physical control block downstream (PCBd) field, and a downstream speed.

The calculating the unidirectional delay delta value may include determining, as the unidirectional delay delta value, a product of a value that is a result of subtracting a difference value of the second current time and the second compensation time from a difference value of the first compensation time and the first current time and a value obtained by dividing the downstream refractive index by a sum of the downstream refractive index and the upstream refractive index.

The calculating the offset time may determine a result of addition of a value found by dividing the length of the PCBd field by the downstream speed and the unidirectional delay delta value as the offset time.

The calculating the first compensation time may include determining a result of subtraction of a value obtained by dividing the length of the PCBd field by the downstream speed from the first current time as the first compensation time.

The calculating the second compensation time may include determining a result of adding a value that is found by dividing a value of addition of a length of a physical layer overhead upstream (PLOu) field and a length of a physical layer operation and maintenance (PLOAM) field, by an upstream speed, to the first current time, as the second compensation time.

The synchronizing may include shifting to an operation state, receiving a synchronous time message including the third current time of the optical line terminal from the optical line terminal, and adding the third current time to the offset time.

The synchronizing may be repeatedly performed at a predetermined period.

The receiving the ranging request message, the calculating the first compensating time, the transmitting the serial number response message, the calculating the second compensation time, the receiving the ranging time message, and the calculating the offset time may be performed again when the peripheral environment is changed.

A method for managing a network according to an exemplary embodiment of the present invention is a method for managing a network by an optical line terminal that is a transmitting/receiving apparatus of a service provider of a passive optical network system, the method for managing a network including: transmitting a ranging request message including a first current time of the optical line terminal to an optical network terminal after an optical network terminal, which is a connection apparatus of a subscriber of the passive optical network, is shifted to a ranging state; receiving a serial number response message from the optical network terminal; transmitting a ranging time message including a receiving time of the serial number response message to the optical network terminal; and transmitting a synchronous time message including the second current time of the optical line terminal after the optical network terminal is shifted to the operation state.

The transmitting the synchronous time message may be repeatedly performed at a predetermined period.

The transmitting the ranging request message, the receiving the serial number response message, and the transmitting the ranging time message may be performed again when the peripheral environment is changed.

An optical network terminal according to yet another exemplary embodiment of the present invention is an optical network terminal that is a connection apparatus of a subscriber of a passive optical network system, the optical network terminal including: a receiver that receives a ranging request message and a ranging time message from an optical line terminal that is a transmitting and receiving apparatus of a service provider of the passive optical network system; a transmitter that transmits a serial number response message as a response to the ranging request message to the optical line terminal; a detector that detects the ranging request message and the ranging time message; a storage unit that stores a first current time when the optical line terminal transmits the ranging request message and a second current time when the optical network terminal transmits the serial number response message; and a calculator that calculates the first compensation time compensating the transmission delay from the first current time and calculates the second compensation time compensating the transmission delay from the second current time.

The calculator may determine a result of subtraction of a value obtained by dividing a length of a PCBd field by a downstream speed from the first time as the first compensation time, and may determine a result of adding a value that is found by dividing a value of addition of a length of a PLOu field and a length of a PLOAM field by an upstream speed to the second current time as the second compensation time.

The calculator may further calculate a unidirectional delay delta value based on the first current time, the second current time, the first compensation time, the second compensation time, a refractive index of an upstream wavelength, and a refractive index of a downstream wavelength, and determines the offset time based on the unidirectional delay delta value, the length of the PCBd field, and the downstream speed.

The optical network terminal may further include a synchronizer that synchronizes a clock of the optical network terminal and a clock of the optical line terminal based on the offset time.

The receiver may receive the synchronous time message from the optical line terminal, and the synchronizer may add a third current time when the optical line terminal transmits the synchronous time message of the offset time.

An optical line terminal according to still another exemplary embodiment of the present invention is an optical line terminal that is a transmitting/receiving apparatus of a service provider of a passive optical network system, the optical line terminal including: a transmitter that transmits a ranging request message and a ranging time message to an optical network terminal that is a connection apparatus of a subscriber of a passive optical network system; a receiver that receives a serial number response message for the ranging request message from the optical network terminal; a detector that detects the serial number response message; and a storage unit that stores a time of receiving the serial number response message.

The transmitter may further transmit the synchronous time message to the optical network terminal at a predetermined period when the optical network terminal calculates the offset time, and is then shifted to the operation mode.

The transmitter may repeatedly transmit the ranging request message and the ranging time message, and the receiver repeatedly receives the serial number response message when the peripheral environment is changed.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

An optical network according to an exemplary embodiment of the present invention will now be described in detail with reference to FIG. 1.

Figure 1:
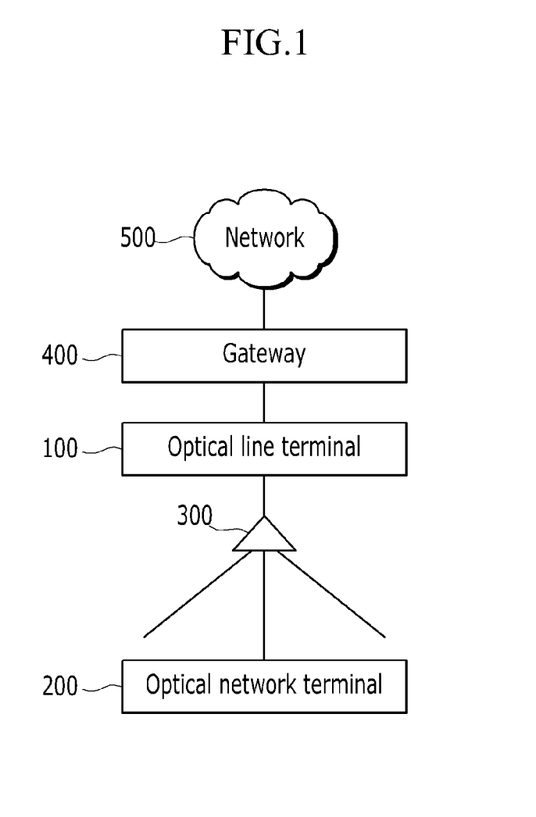
FIG. 1 is a diagram schematically showing an optical network according to an exemplary embodiment of the present invention.

FIG. 1 is a diagram schematically showing an optical network according to an exemplary embodiment of the present invention.

Referring to FIG. 1, an optical network according to an exemplary embodiment of the present invention is a gigabit capable passive optical network (GPON), and includes an optical line terminal (OLT) 100, an optical network terminal (ONT) 200, an optical splitter 300, and a gateway access service network gateway (ASN-GW) 400.

The optical line terminal 100 is an apparatus that is installed in stations of an optical network service provider, and transmits/receives signals to/from the optical network terminal 200. The optical line terminal 200 mutually connects the subscriber network 400 that includes the optical splitter 300 and the optical network terminal 200 to a backbone network 500, and terminates an optical signal transmitted through an optical fiber.

The optical network terminal 200 is an apparatus that is installed in a subscriber home of the optical network and connects the subscriber to the optical network. A plurality of optical network terminals 200 are connected to the optical line terminal 100 via the optical splitter 300. The upstream speed and the downstream speed between the optical line terminal 100 and the optical network terminal 200 can be varied.

The optical splitter 300 branches the optical signal from one optical line terminal 100 and transmits it to the plurality of optical network terminals 200.

The gateway 400 connects the optical line terminal 100 to the backbone network 500.

Figure 2:
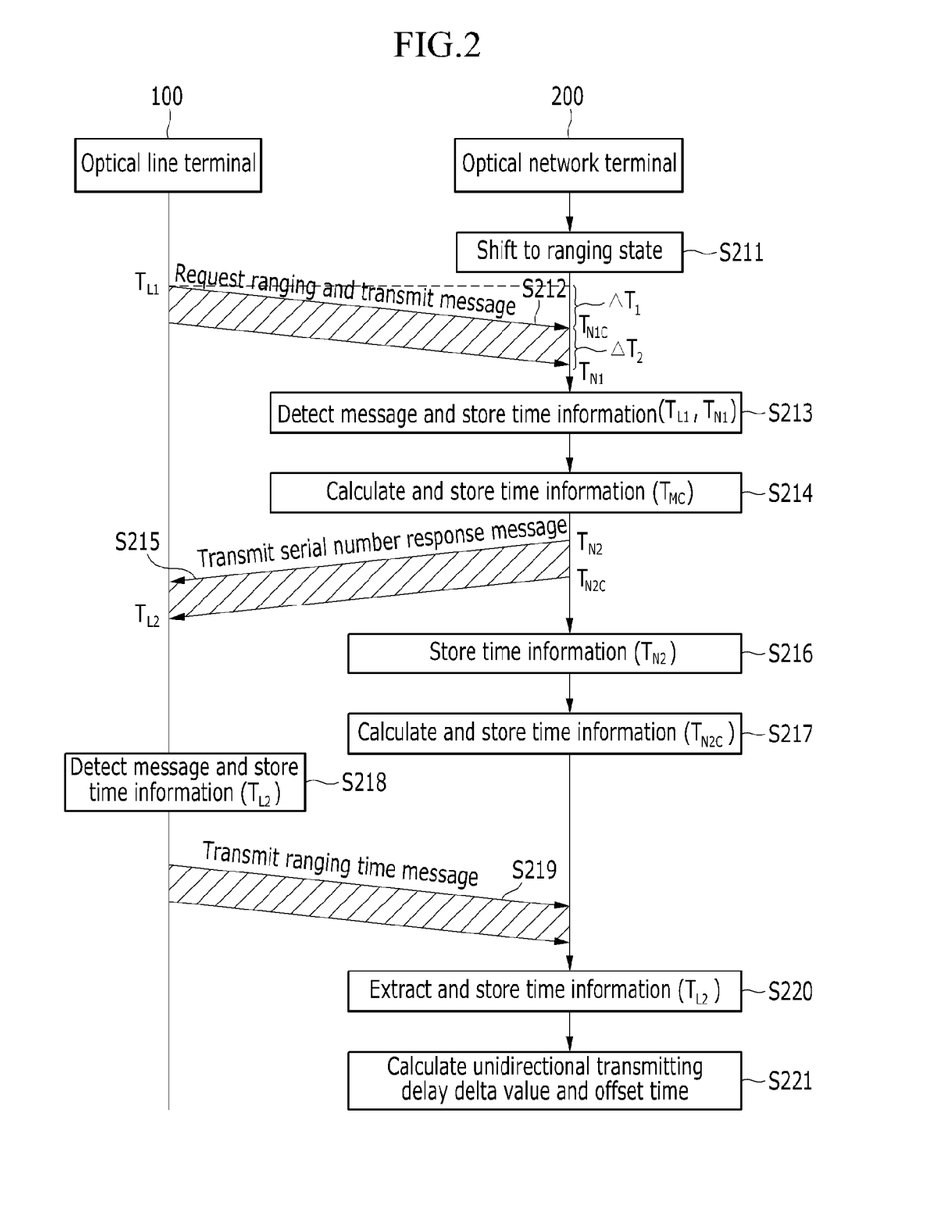
FIG. 2 is a diagram sequentially showing signals transmitted and received between an optical line terminal and an optical network terminal according to one embodiment of the present invention in a ranging state.
Figure 3:
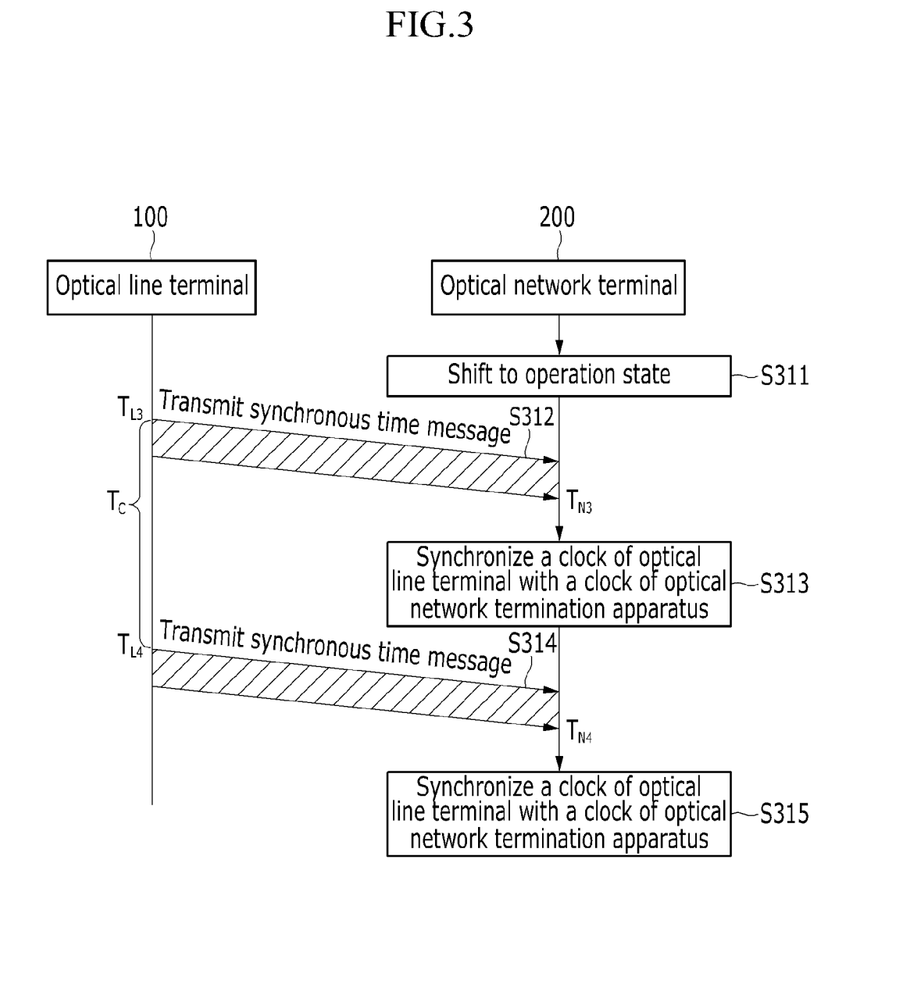
FIG. 3 is a diagram sequentially showing signals transmitted and received by the optical line terminal and the optical network terminal according to the exemplary embodiment of the present invention in an operation state.

Referring to FIGS. 2 and 3, a method for time synchronization according to the exemplary embodiment of the present invention will be described in detail.

FIG. 2 is a diagram sequentially showing signals transmitted and received between an optical line terminal and an optical network terminal according to one embodiment of the present invention in a ranging state, and FIG. 3 is a diagram sequentially showing signals transmitted and received by the optical line terminal and the optical network terminal according to the exemplary embodiment of the present invention in an operation state.

Referring to FIG. 2, the optical network terminal 200 is first shifted to a ranging (S211) state.

In the network, the optical line terminal 100 periodically performs an optical network terminal discovery process in order to discover a connection of a new optical network terminal 200. The newly discovered optical network terminal 200 is shifted to the ranging state via an initial state, a standby state, and a serial number state. In this ranging state, the optical network terminal 200 calculates an equalization delay, and the process of FIG. 2 to be described below is performed in parallel with an operation of calculating the equalization delay.

If the optical network terminal 200 is shifted to the ranging state, the optical line terminal 100 transmits a ranging request message to the optical network terminal 200 (S212).

The ranging request message has a structure to allocate an allocation identifier-254 (allocation-ID 254, Alloc-ID 254) to an upstream bandwidth map. The ranging request message includes a physical layer operation and maintenance (PLOAM) message, and the PLOAM message transmits a synchronous time PLOAM (SYNC Time PLOAM) message. The synchronous time PLOAM includes a current time $T_{L1}$ when the optical line terminal 100 starts to transmit the ranging request message.

The optical network terminal 200 receives the ranging request message from the optical line terminal 100 and then detects the ranging request message, and when the synchronous time PLOAM message is included in the ranging request message, stores a current time $T_{N1}$ of the optical network terminal 200 and a current time $T_{L1}$ of the optical line terminal 100 (S213).

Meanwhile, a transmission delay ($\Delta T_1$) between the terminals 100 and 200 as well as a transmission delay ($\Delta T_2$) for data transmission of each terminal 100 and 200 occurs between the current time $T_{N1}$ of the optical network terminal 200 and the current time $T_{L1}$ of the optical line terminal 100.

When the difference between the upstream stream speed and the downstream speed is large, the difference of the transmission delay $\Delta T_2$ is large.

The optical network terminal 200 calculates and stores a time $T_{N1C}$ when the transmission delay $\Delta T_2$ is compensated (S214). Since the gigabit capable passive optical network has an asymmetrical structure having different transmission speeds of the upstream and downstream, the difference of the transmission delay $\Delta T_2$ is large. Therefore, in order to compensate this, the optical network terminal 200 calculates the time $T_{N1C}$ when the transmission delay is compensated according to the following Equation 1.

$$T_{N1C}=T_{N1}-\Delta T_2=T_{N1}-\text{PCBd/Vds} \qquad \text{[Equation 1]}$$

The PCBd represents the length of the physical control block downstream field and the unit is bits, Vds represents a downstream speed and the unit is bit/sec, and the unit of time $T_{N1C}$ when the transmission delay is compensated and a current time $T_{N1}$ of the optical network terminal 200 is sec.

The physical layer overhead downstream (PCBd) field is varied according to the size of the upstream bandwidth map, and when the ranging request message is 8 bytes, it is 38 bytes, for a total of 304 bits.

Then, the optical network terminal 200 transmits a serial number response message as a response to the ranging request message received from the optical line terminal 100 to the optical line terminal 100 (S215). At this time, the optical network terminal 200 stores the current time $T_{N2}$ of the optical network terminal 200 that is the time of transmitting the serial number response message (S216). In addition, the optical network terminal 200 calculates and stores the time $T_{N2C}$ when the transmission delay $\Delta T_2$ is compensated (S217). At this time, the time $T_{N2C}$ when the transmission delay $\Delta T_2$ is compensated is calculated according to the following Equation 2.

$$T_{N2C}=T_{N2}+((\text{PLOu}+\text{PLOAM})/\text{Vus}) \qquad \text{[Equation 2]}$$

The PLOu represents the length of the physical layer overhead upstream field and the unit is bits, the POLMA represents a physical layer operation and maintenance field and the unit is bits, Vus represents an upstream speed and the unit is bit/sec, and the unit of a time $T_{N2C}$ when the transmission delay $\Delta T_2$ is compensated and a current time $T_{N2}$ of the optical network terminal 200 is sec.

In Equation 2, the PLOu may be 15 bytes, that is, 120 bits, and the PLOAM may be 13 bytes, that is, 104 bits.

The optical line terminal 100 receives a serial number response message, and then detects a serial number response message and stores a current time $T_{L2}$ of receiving the serial number response message (S218).

Then, the optical line terminal 100 transmits the ranging time message to the optical network terminal 200. The ranging time message includes the PLOAM message, and the PLOAM message includes the equalization delay and the current time $T_{L2}$ when the serial number response message is received.

The optical network terminal 200 receives the ranging time message, and then extracts the current time $T_{L2}$ when the serial number response message is received from the ranging time message and stores it (S220).

Then, the optical network terminal 200 calculates the unidirectional delay delta value $\Delta Tpd$ and the offset time Tos based on the stored time information $T_{L1}$, $T_{N1C}$, $T_{L2}$, and $T_{N2C}$, a refractive index ($n_d$) of the upstream wavelength, and a refractive index ($n_u$) of the downstream wavelength (S221). At this time, the unidirectional delay delta value $\Delta Tpd$ and the offset time Tos are calculated according to the following Equations 3 and 4.

$$\Delta Tpd = \frac{n_d}{n_u + n_d}\{(T_{N1C} - T_{L1}) - (T_{L2} - T_{N2C})\} \quad \text{[Equation 3]}$$

$$Tos = \Delta Tpd + \frac{(Psync + Ident + PLOAMd)}{Vds} \quad \text{[Equation 4]}$$

In Equation 4, Psync, Went, and PLOAMd may be a length of a field included in the PCBd field, wherein Psync may be 4 bytes, Indent may be 4 bytes, and PLOAMd may be 13 bytes.

Referring to FIG. 3, the optical network terminal 200 is shifted to the operation state (S311).

Then, the optical line terminal 100 transmits the synchronous time message to the optical network terminal 200 (S312). The synchronous time message is the synchronous time PLOAM message, and the optical line terminal 100 includes the current time $T_{L3}$ when the synchronous time message is transmitted.

The optical network terminal 200 receives the synchronous time message, and then adds the current time $T_{L3}$ of the optical line terminal 100 to the offset time Tos, thereby synchronizing the clock of the optical network terminal 200 to the clock of the optical line terminal 200 (S313).

The optical line terminal 100 repeatedly transmits the synchronous time message including the current time $T_{L4}$ to the optical network terminal 200 at a period of Tc (S314), and the optical network terminal 200 receives the synchronous time message to repeatedly perform the step (S315) of synchronizing the clock of the optical network terminal 200 to the clock of the optical line terminal 200.

As described above, the optical line terminal 100 periodically transmits the synchronous time message to the optical network terminal 200 to modify a fine time displacement, and when the time displacement of the optical network terminal 200 is out of the defined range, the media access control (MAC) layer of the optical line terminal 100 immediately confirms it and again performs the ranging process for the corresponding optical network terminal 200, as shown in FIG. 2. A new offset time is set through the ranging process that is performed again, such that it can correspond to the changed environment. Therefore, the time synchronization between the optical line terminal 100 and the optical network terminal 200 can be accurately and easily performed.

Hereinafter, the optical line terminal 100 according to the exemplary embodiment of the present invention will be described with reference to FIG. 4.

Figure 4:
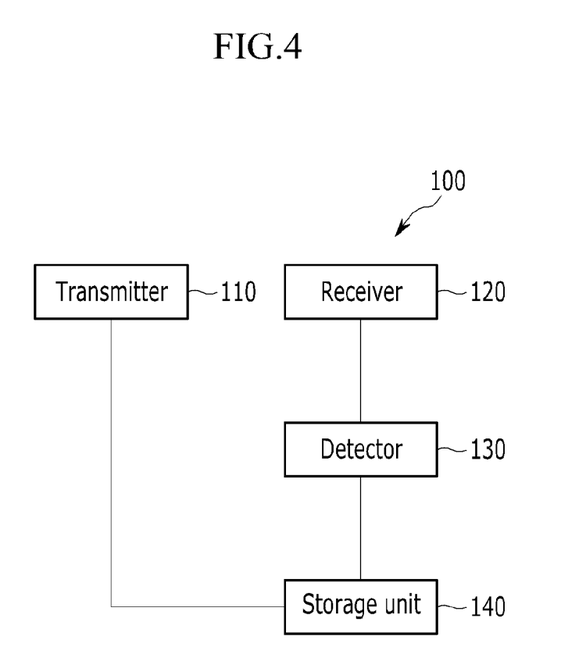
FIG. 4 is a block diagram of an optical line terminal according to an exemplary embodiment of the present invention.

FIG. 4 is a block diagram of an optical line terminal according to an exemplary embodiment of the present invention.

Referring to FIG. 4, the optical line terminal 100 according to the exemplary embodiment of the present invention includes a transmitter 110, a receiver 120, a detector 130, and a storage unit 140.

The transmitter 110 transmits the ranging request message, the ranging time message, and the synchronous time message to the optical network terminal 200. The ranging request message includes the current time $T_{L1}$ of the optical line terminal 100, the ranging time message includes the equalization delay and the current time $T_{L2}$ of the optical line terminal, and the synchronous time message includes the current times $T_{L3}$ and $T_{L4}$ of the optical line terminal 100.

The receiver 120 receives the serial number response message from the optical network terminal 200. The serial number response message is a response to the ranging request message.

The detector 130 detects the contents of the serial number response message that is received from the optical network terminal 200.

The storage unit 140 stores the receiving time $T_{L2}$ of the serial number response message.

Hereinafter, the optical network terminal according to the exemplary embodiment of the present invention will be described in detail with reference to FIG. 5.

Figure 5:
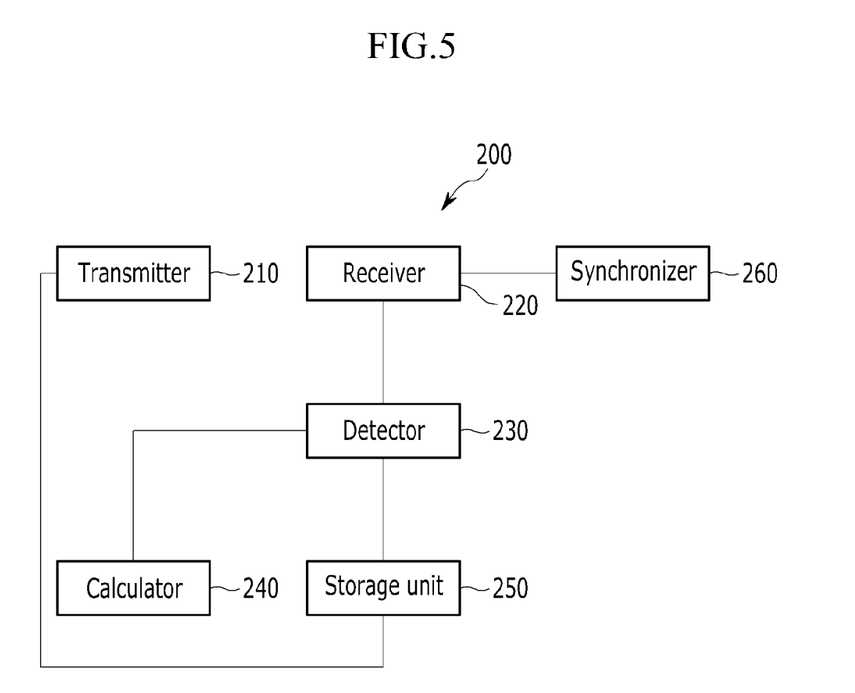
FIG. 5 is a block diagram of an optical network terminal according to an exemplary embodiment of the present invention.

FIG. 5 is a block diagram of an optical network terminal according to an exemplary embodiment of the present invention.

Referring FIG. 5, the optical network terminal 200 according to the exemplary embodiment of the present invention includes a transmitter 210, a receiver 220, a detector 230, a calculator 240, a storage unit 250, and a synchronizer 260.

The transmitter 210 transmits the serial number response message to the optical line terminal 100.

The receiver 220 receives the ranging request message, the ranging time message, and the synchronous time message from the optical line terminal 100.

The detector 230 detects the contents of the ranging request message and the contents of the ranging time message that are received from the optical line terminal 100.

The calculator 240 calculates the time $T_{N1C}$ when the transmission delay is compensated according to the detection result of the ranging request message at the current time of the optical line terminal 100, and calculates the time $T_{N2C}$ when the transmission delay is compensated at the current time $T_{N2}$ when the serial number response time is transmitted. In addition, the calculator 240 calculates the unidirectional delay delta value $\Delta Tpd$ and the offset time Tos based on the time information $T_{L1}$, $T_{N1C}$, $T_{L2}$, and $T_{N2C}$, the refractive index ($n_d$) of the upstream wavelength, and the refractive index ($n_u$) of the downstream wavelength (S221).

The storage unit 250 stores the current times $T_{L1}$ and $T_{L2}$ of the optical line terminal 100 based on the ranging request message and the compensation times $T_{N1C}$ and $T_{N2C}$, etc., that are calculated in the calculator 240.

The synchronizer 260 adds the offset time Tos to the current times $T_{L3}$ and $T_{L4}$ that are included in the synchronous time message from the optical line terminal 100, thereby synchronizing the clock of the optical network terminal 200 to the clock of the optical line terminal 100.

According to the exemplary embodiments of the present invention, it is possible to accurately and easily perform time synchronization between an optical line terminal and an optical network terminal in a gigabit capable passive optical network having an asymmetrical transmission speed.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for time synchronization of an optical network terminal (ONT), which is a connection apparatus of a service provider of a passive optical network system, and an optical line terminal (OLT), which is a transmitting/receiving apparatus of a service provider of the passive optical network system, comprising:

shifting to a ranging state;

receiving a ranging request message that comprises a first current time of the optical line terminal from the optical line terminal;

calculating a first compensation time when a transmission delay is compensated at a time that the ranging request message is received;

transmitting a serial number response message to the optical line terminal;

calculating a second compensation time when the transmission delay is compensated at a time that the serial number response message is transmitted;

receiving a ranging time message that comprises a second current time when the serial number response message from the optical line terminal is received;

calculating an offset time from the first current time, the second current time, the first compensation time, and the second compensation time; and synchronizing a clock of the optical network terminal and a clock of the optical line terminal based on the offset time.

2. The method for time synchronization of claim 1, wherein the calculating the offset time comprises:

calculating a unidirectional delay delta value based on the first current time, the second current time, the first compensation time, the second compensation time, a refractive index of an upstream wavelength, and a refractive index of a downstream wavelength; and calculating the offset time based on the unidirectional delay delta value, a length of a physical control block downstream (PCBd) field, and a downstream speed.

3. The method for time synchronization of claim 2, wherein the calculating the unidirectional delay delta value comprises:

determining, as the unidirectional delay delta value, a result that multiplies a value that subtracts a difference value of the second current time and the second compensation time from a difference value of the first compensation time and the first current time by a value obtained by dividing the downstream refractive index by a sum of the downstream refractive index and the upstream refractive index.

4. The method for time synchronization of claim 2, wherein the calculating the offset time determines comprises a result of addition of a value found by dividing the length of the PCBd field by the downstream speed and the unidirectional delay delta value as the offset time.

5. The method for time synchronization of claim 1, wherein the calculating the first compensation time comprises determining a result of subtraction of a value obtained by dividing the length of the PCBd field by the downstream speed from the first current time as the first compensation time.

6. The method for time synchronization of claim 1, wherein the calculating the second compensation time comprises determining a result of adding a value that is found by dividing a value of addition of a length of a physical layer overhead upstream (PLOu) field and a length of a physical layer operation and maintenance (PLOAM) field, by an upstream speed, to the first current time, as the second compensation time.

7. The method for time synchronization of claim 1, wherein the synchronizing comprises shifting to an operation state, receiving a synchronous time message comprising the third current time of the optical line terminal from the optical line terminal, and adding the third current time to the offset time.

8. The method for time synchronization of claim 7, wherein the synchronizing is repeatedly performed at a predetermined period.

9. The method for time synchronization of claim 1, wherein the receiving the ranging request message, the calculating the first compensating time, the transmitting the serial number response message, the calculating the second compensation time, the receiving the ranging time message, and the calculating the offset time is performed again when the peripheral environment is changed.

10. An optical network terminal that is a connection apparatus of a subscriber of a passive optical network system, comprising:

a receiver that receives a ranging request message and a ranging time message from an optical line terminal that is a transmitting and receiving apparatus of a service provider of the passive optical network system;

a transmitter that transmits a serial number response message as a response to the ranging request message to the optical line terminal;

a detector that detects the ranging request message and the ranging time message;

a storage unit that stores a first current time when the optical line terminal transmits the ranging request message and a second current time when the optical network terminal transmits the serial number response message; and a calculator that calculates the first compensation time when the transmission delay is compensated from the first current time and calculates the second compensation time when the transmission delay is compensated from the second current time.

11. The optical network terminal of claim 10, wherein the calculator determines a result of subtraction of a value obtained by dividing a length of a PCBd field by a downstream speed from the first time as the first compensation time, and determines a result of adding a value that is found by dividing a value of addition of a length of a PLOu field and a length of a PLOAM field by an upstream speed to the second current time as the second compensation time.

12. The optical network terminal of claim 10, wherein the calculator further calculates a unidirectional delay delta value based on the first current time, the second current time, the first compensation time, the second compensation time, a refractive index of an upstream wavelength, and a refractive index of a downstream wavelength, and determines the offset time based on the unidirectional delay delta value, the length of the PCBd field, and the downstream speed.

13. The optical network terminal of claim 11, further comprising a synchronizer that synchronizes a clock of the optical network terminal and a clock of the optical line terminal based on the offset time.

14. The optical network terminal of claim 13, wherein the receiver receives the synchronous time message from the optical line terminal, and the synchronizer adds a third current time when the optical line terminal transmits the synchronous time message of the offset time.

* * * * *